United States Patent [19]

Araki et al.

[11] Patent Number: 4,653,885

[45] Date of Patent: Mar. 31, 1987

[54] MOTOR-DRIVEN FILM WINDER FOR CAMERAS

[76] Inventors: Kunihiko Araki, 4-1-603 Kitakasai 4-chome, Edogawa-ku, Tokyo; Tomoya Kitajima, #106, Sun View Heights, 87-51 Hisamoto, Takatsu-ku, Kawasaki-shi, Kanagawa; Yoshio Serikawa, 21-13-307 Honjo 4-chome, Sumida-ku, Tokyo; Hiroshi Terui, #6, Sasamotoso, 20-10 Denenchofu 2-chome, Ohta-ku, Tokyo; Kenji Koyama, c/o Ricoh-ryo, 13-5 Utsukushigaoka 1-chome, Midori-ku, Yokohama-shi, Kanagawa; Mikio Kobayashi, 14-6 Miyazaki 6-chome, Miyamae-ku, Kawasaki-shi, Kanagawa, all of Japan

[21] Appl. No.: 777,283

[22] Filed: Sep. 18, 1985

[51] Int. Cl.⁴ .............................................. G03B 1/18
[52] U.S. Cl. ................................................ 354/173.1
[58] Field of Search ............................... 354/170–172, 354/173.1, 173.11

[56] References Cited

U.S. PATENT DOCUMENTS

| | | | |
|---|---|---|---|
| 4,167,314 | 9/1979 | Ichiyanogi et al. | 354/173.11 |
| 4,206,987 | 6/1980 | Sunouchi et al. | 354/173.11 X |
| 4,529,282 | 7/1985 | Yamamoto | 354/173.1 |

*Primary Examiner*—William B. Perkey

[57] ABSTRACT

A motor-driven film winder for use with a camera having a film winding mechanism has a motor, a first system for transmitting rotative power from the motor to the film winding mechanism, a second system for transmitting rotative power from the motor to a mounting screw for threaded engagement in a tripod screw hole of the camera, and a switching control assembly for selectively operating the first or second system. The second system includes first and second selector gears angularly movable about the axis of a main gear and rotatable about their own axes in opposite directions. One of the first and second selector gears is selectively coupled, at a time, to the mounting screw by the switching control assembly.

10 Claims, 14 Drawing Figures

MOTOR-DRIVEN FILM WINDER FOR CAMERAS

BACKGROUND OF THE INVENTION

The present invention relates to a motor-driven film winder for use with cameras which has a film-winding motor that can be utilized for attaching the film winder to and detaching the film winder from the camera.

Motor-driven film winders are normally attached to cameras by threading and tightening a mounting screw through the film winder into the tripod screw hole in the bottom of the camera. As the film winder is mounted on the camera, the drive coupler of the film winder is mechanically connected to the driven coupler of the camera and at the same time the film winder and the camera are electrically connected. In use, an exposure end signal and a film winding completion signal (or a shutter charge signal) are transmitted from the camera to the film winder to control the energization and de-energization of the motor in the motor-driven film winder.

The conventional motor-driven film winders are attached to and detached from the cameras by manually tightening and loosening the mounting screws. Therefore, it is tedious and timing-consuming to mount and remove the film winders. The mounting screws are liable to be tightened with varying forces. If the tightening force is weak, then the film winder tends to get loose gradually from the camera until the electric connection between the camera and the film winder is rendered unstable or otherwise impaired, resulting in a film winding failure.

SUMMARY OF THE INVENTION

It is an object of the present invention to provide a motor-driven film winder having a simple mechanism for automatically attaching the film winder to and detaching the same from a camera easily and quickly.

Another object of the present invention is to provide a motor-driven film winder which can easily and quickly be attached to and detached from a camera and which can switch a mounting screw smoothly and reliably from a tightening mode to a loosening mode.

Still another object of the present invention is to provide a motor-driven film winder which can be attached to and detached from a camera automatically and, if desired, manually through a manual rotation member, and which can avoid a danger arising from unexpected or accidental rotation of the motor in case the manual rotation member can be touched externally.

A still further object of the present invention is to provide a motor-driven film winder having a mechainsm for automatically mounting the film winder on a camera, the mechanism being inoperative when the mount surface of the camera is not held in the normal mounting position on the film winder thereby to prevent unsmooth and unstable mechanical and electric connection between the camera and the film winder and also to prevent components from being damaged or malfunctioning due to inaccurate positioning of the film winder with respect to the camera.

According to the present invention, there is provided a motor-driven film winder for use with a camera having a film winding mechanism has a motor, a first system for transmitting rotative power from the motor to the film winding mechanism, a second system for transmitting rotative power from the motor to a mounting screw for threaded engagement in a tripod screw hole of the camera, and a switching control assembly for selectively operating the first or second system. The second system includes first and second selector gears angularly movable about the axis of a main gear and rotatable about their own axes in opposite directions. One of the first and second selector gears is selectively coupled, at a time, to the mounting screw by the swithcing control assembly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
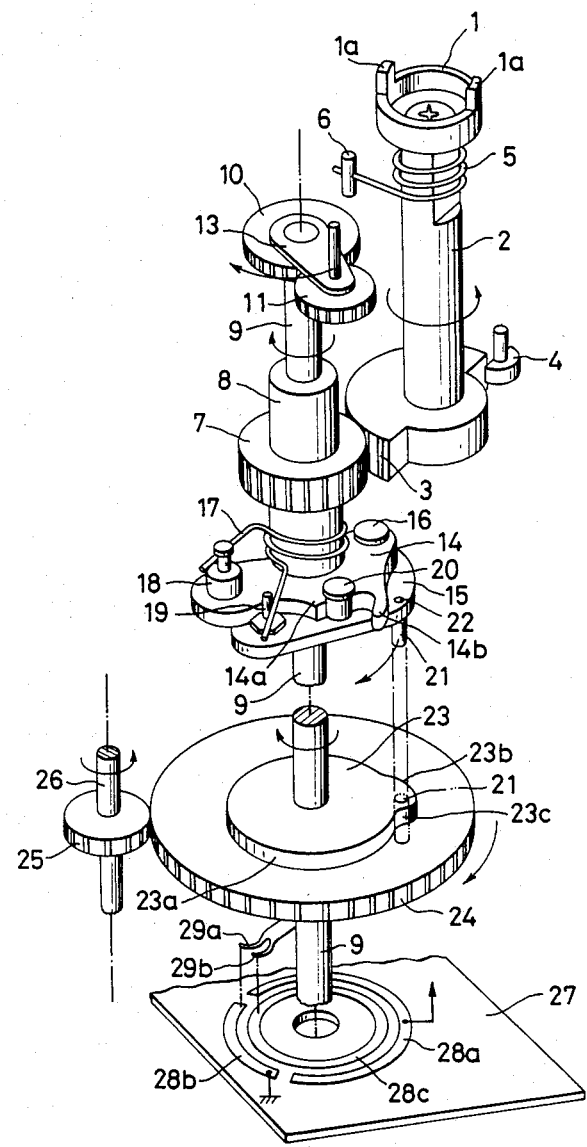
FIG. 2 is an exploded perspective view of a system for transmitting a winding drive force in the motor-driven film winder.

A motor-driven film winder for use with a camera includes a system for transmitting a winding drive force to the camera. This system for transmitting the winding drive force will first be described with reference to FIG. 2. In FIG. 2, a drive coupler 1 serving as a rotative force coupling means has a pair of fingers 1a. When the motor-driven film winder is mounted on the bottom of the camera, the fingers 1a engage a driven coupler (not shown) which drives a film winding mechanism and a shutter charging mechanism in the camera. The drive coupler 1 is screwed to one end of a rotatable shaft 2 which supports on the other end a semicircular gear 3 fixed thereto. The rotatable shaft 2 is limited in its angular movement about its own axis by a stop pin 4 fixedly positioned in the range of angular movement of the semicircular gear 3. A return spring 5 disposed around the rotatable shaft 2 has one end engaging a pin 6 and the other end fixed to the rotatable shaft 2. The rotatable shaft 2 is rotated in the direction of the arrow to wind a film. When the shaft 2 is rotated in the direction of the arrow, the return spring 5 is wound to store energy therein. When the film is not to be wound, the rotatable shaft 2 is urged by the return spring 5 to turn in the direction opposite to the direction of the arrow until the semicircular gear 3 is held against the stop pin 4.

The semicircular gear 3 is held in mesh with a gear 7 integral with an intermediate portion of a cylindrical boss 8 through which a rotatable shaft 9 loosely extends in coaxial relation. The rotatable shaft 9 has an upper end projecting out of the boss 8 and supports a sun gear 10 fixed thereto and meshing with a planet gear 11. A connector plate 13 has one end fitted over the projecting upper end of the rotatable shaft 9, the connector plate 13 being angularly movable with respect to the rotatable shaft 9 with more or less frictional forces produced therebetween. The planet gear 11 has a shaft 12 mounted on the other end of the connector plate 13. Therefore, the planet gear 11 is angularly movable through an angle around the sun gear 10 as the sun gear 10 rotates.

An upper clutch plate 14 is fixedly fitted over the lower end of the boss 8, and a lower clutch plate 15 underlies the upper clutch plate 14 in parallel relation thereto. The upper and lower clutch plates 14, 15 are relatively angularly movably coupled to each other by a common shaft 16 mounted on the lower clutch plate 15. A clutch spring 17 is coiled around the boss 8 below the gear 7. The clutch spring 17 has one end engaging a pin 18 mounted on the upper clutch plate 14 and the other end engaging a pin 19 mounted on the lower clutch plate 15. The lower clutch plate 15 is normally urged by the clutch spring 17 to turn clockwise (FIG. 2) around the common shaft 16 with respect to the upper clutch plate 14. A rotation limit pin 20 is mounted on the lower clutch plate 15 for engagement with the upper clutch plate 14. When the rotation limit pin 20 abuts against one of spaced-apart ridges 14a, 14b on the upper clutch plate 14, the angular displacement of the lower clutch plate 15 with respect to the upper clutch plate 14 is limited.

A shaft 22 is mounted on the lower surface of the lower clutch plate 15 at a peripheral edge thereof, with a roller 21 fitted over the shaft 22. A plate cam 23 is fixedly mounted on the rotatable shaft 9 below the upper and lower clutch plates 14, 15. The roller 21 on the lower clutch plate 15 is normally urged to abut against an outer cam surface 23a of the plate cam 23. The outer cam surface 23a has a radially outwardly projection portion composed of a gradual surface 23b having its curvature increasing gradually in the direction of rotation of the cam 23 which is opposite to the direction of the arrow, and a steeper surface 23c contiguous to the gradual surface 23b and having its curvature decreasing relatively abruptly in the same direction. The roller 32 slides or rolls on the cam surface 23a.

A larger-diameter gear 24 is fixedly fitted over the rotatable shaft 9 beneath the cam 23 and held in mesh with a smaller-diameter gear 25 fixed to a rotatable shaft 26 coupled through a speed reducer (not shown) to the drive shaft of a motor. A position detector baseboard 27 is disposed below the larger-diameter gear 24 for detecting the angular position of the larter-diameter gear 24. The position detector baseboard 27 supports on its upper surface electrically conductive patterns 28a, 28b,28c concentric to the larger-diameter gear 24. Two brushes 29a, 29b on one bifurcated brush body are disposed on the lower surface of the larger-diameter gear 24. The brush 29a is selectively slidably engageable with the conductive pattern 28a or 28b, and the brush 29b is normally held in sliding engagement with the conductive pattern 28c.

Operation of the winding drive force transmitting system of the above construction will be described below.

When a motor driver (described later on) is set to a motor rotation mode to drive the motor in the film winding direction from the position of FIG. 2, the rotatable shaft 26 is rotated counterclockwise to rotate the smaller-diameter gear 25 in the same direction. Speed of rotation of the smaller-diameter gear 25 is reduced by the larger-diameter gear 24 meshing therewith to rotate the cam 23 on the shaft 9.

Figure 3:
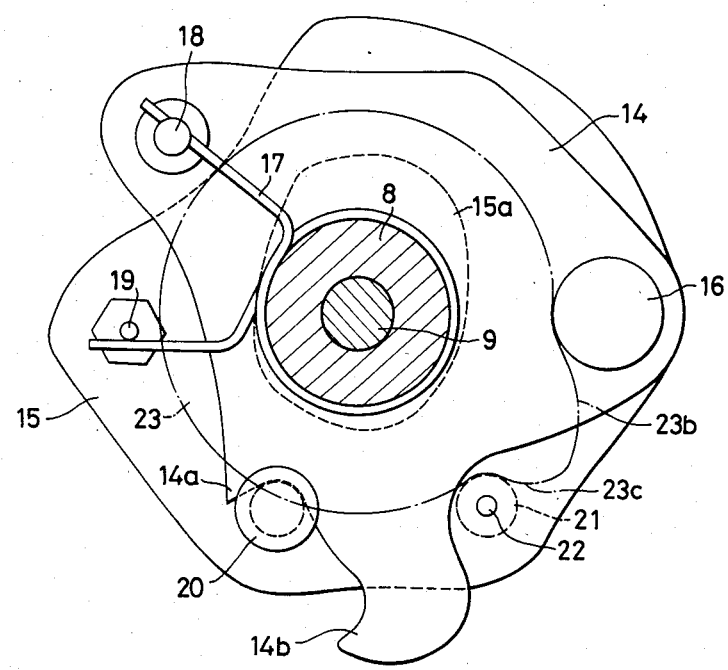
FIG. 3 is an enlarged plan view of the system shown in FIG. 2.

FIG. 3 shows the cam 23, the upper clutch plate 14, and the lower clutch plate 15, as seen from above. The steeper surface 23c of the cam surface 23a pushes the roller 21 radially outwardly to turn the lower clutch plate 15 clockwise about the common shaft 16. The upper clutch plate 14 is not turned clockwise by the common shaft 16 coupled to the lower clutch plate 15 and the rotation limit pin 20 held against the ridge 14a.

As the upper clutch plate 15 is thus turned in FIG. 2, the gear 7 is also turned clockwise to cause the semicircular gear 3 meshing therewith to turn counterclockwise for thereby rotating the drive coupler 1. The drive coupler 1 then forces the driven coupler (not shown) in the camera to drive the film winding mechanism composed of a sprocket and a film takeup spool and the shutter charging mechanism for winding the film and charging the shutter. When the film has been wound or transported by one frame, the sprocket in the camera is forcibly prevented from rotating in the film winding direction. Continued rotation of the rotatable shaft 2 by the motor causes the roller 21 to go over and beyond the steeper surface 23c against the force of the clutch spring 17. As the roller 21 is moved past the steeper surface 23c, the lower clutch plate 15 is no longer subject to the drive force of the motor. The rotatable shaft 2 is now turned clockwise under the energy stored in the return spring 5 until the end of the semicircular gear 3 engages the stop pin 4 as shown in FIG. 2. At this time, the rotation of the motor is controlled by the brushes 29a, 29b beneath the larger-diameter gear 24. For emaple, when the brush 29a is held in contact with the conductive pattern 28a, the motor is energized, and when the brush 29a contacts the conductive pattern 28b, a signal for de-energizing the motor is generated.

The motor-driven film winder also has a mounting means for attaching and detaching the film winder to and from the camera, a system for transmitting a drive force to the mounting means, and a switching control means. These means and system will be described with reference to FIG. 1.

Figure 1:
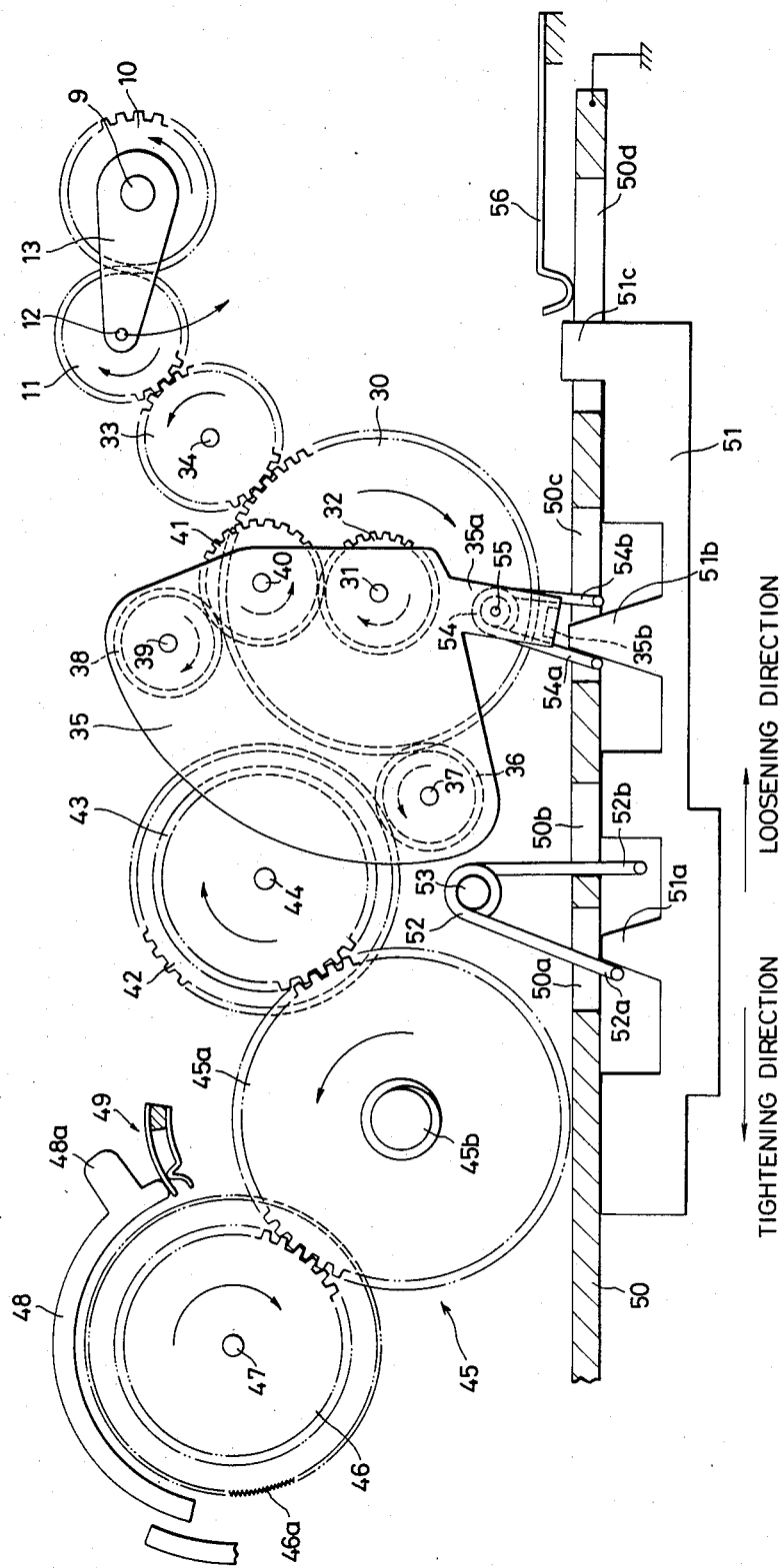
FIG. 1 is a plan view of a system for transmitting a drive force in an attachment and detachment means of a motor-driven film winder according to the present invention.

As illustrated in FIG. 1, the sun gear 10 which is fixed to the rotatable shaft 9 (FIG. 2) is rotated counterclockwise when the motor is rotated in its normal direction. (Rotation of the motor in the normal direction will hereinafter be referred to simply as "rotation".) Various gears shown in FIG. 1 are rotated in the directions of the arrows when the motor is rotated in the opposite or reverse direction. (Rotation of the motor in the reverse direction will hereinafter be referred to simply as "reverse".) A main gear 30 is rotatably supported by a shaft 31 on a fixed portion of the film winder. A smaller-diameter gear 32 is also mounted on the shaft 31 above the main gear 30 for rotation therewith. An idle gear 33 which is of substantially the same diameter as that of the smaller-diameter gear 32 is rotatably mounted by a shaft 34 on the fixed portion of the film winder. The idel gear 33 is held in mesh with the main gear 30. When the planet gear 11 is turned around the shaft 9 into mesh with the idle gear 33 upon rotation of the sun gear 10, the idle gear 33 transmits the drive force from the motor to the main gear 30.

A sector-shaped switching board 35 is angularly movably supported at its pivot portion remote from the arc on the shaft 31 for angular movement through a certain angular interval. A tightening gear 36 is rotatably supported by a shaft 37 on one end of the sector-shaped switching board 35. The tightening gear 36 serves as a first selector gear held in mesh with the main gear 30. A loosening gear 38 is rotatably supported by a shaft 39 on the other end of the sector-shaped switching board 35. The loosening gear 38 serves as a second selector gear held in mesh with the smaller-diameter gear 32 through an idle gear 41 rotatably mounted by a shaft 40 on the switching board 35. Thus, the rotative force from the smaller-diameter gear 32 is transmitted via the idle gear 41 to the second selector gear 38. The tightening gear 36, the loosening gear 38, and the idle gear 41 are of substantially the same diameter as that of the smaller-diameter gear 32.

Transmission gears 42, 43 are rotatably supported by a shaft 44 mounted on the fixed portion of the film winder. One of the loosening and tightening gears 36, 38 at a time can be brought into mesh with the transmission gear 42. A means 45 for attaching and detaching the film winder to and from the camera has a mounting screw 45b having the same external threads as those of the tripod screw on the upper end of a tripod, and a coupling gear 45a on a peripheral edge portion, the coupling gear 45a being in mesh with the transmission gear 43. An auxiliary gear 46 held in mesh with the coupling gear 45a of the means 45 is rotatably supported by a shaft 47 mounted on the fixed portion of the film winder. The auxiliary gear 46 has an outer knurled peripheral edge 46a through which the auxiliary gear 46 can manually be turned. A protective cover 48 is disposed radially outwardly of the auxiliary gear 46 in covering relation to about a quarter of the gear 46. The protective cover 48 serves to prevent a finger or foreign matter from touching the auxiliary gear 46 while it is rotating, thereby avoiding damage to the finger or breakage of the gear. The protective cover 48 can be turned counterclockwise, for example, along the peripheral edge of the auxiliary gear 46 by a finger engaging a knob 48a on one end of the cover 48, for thereby exposing the knurled edge 46a which can then be turned by a finger. A detector switch 49 is disposed at the end of the protective cover 48 for detecting whether the protective cover 48 is opened or closed. In the illustrated position, the protective cover 48 is closed and pushes the contacts of the detector switch 49 so that the motor can be energized. When the protective cover 48 is turned counterclockwise from the illustrated position, the knurled edge 46a is exposed and the contacts of the switch 49 are spaced from each other, thus preventing the motor from being energized.

The film winder has a switch board 50 and a switching control member 51 slidable along the switch board 50. The switch board 50 has two slots 50a, 50b disposed closely to each other in the direction in which the switching control member 51 is slidable, and slots 50c, 50d. The switching control member 51 has on its surface facing the switch board 50 a projection 51a sliable along the slots 50a, 50b, a projection 51b movable in the slot 50c, and a projection 51c movable in the slot 50d and having a distal end projecting beyond the surface of the switch board 50. A neutral spring 52 is disposed around a pin 53 and has two legs 52a, 52b having bent distal ends and projecting respectively through the slots 50a, 50b toward the switching control member 51 in sandwiching relation to the projection 51a. The projection 51a is normally urged by the neutral spring 52 to be positioned in a neutral position between the two slots 50a, 50b. An arm 35a projects from the pivot portion of the switching board 35, with a pin 55 mounted on the arm 35a. A switching spring 54 has a coiled intermediate portion disposed around the pin 55 and two legs 54a, 54b having bent distal ends and positioned in the slot 50c in sandwiching relation to the projection 51b. The arm 35a has on its distal end a raised portion 35b bent between the legs 54a, 54b of the switching spring 54. Therefore, the switching board 35 is turned around the shaft 31 as the switching spring 54 is turned. A changeover switch 56 is held in contact with the upper surface of the switch board 50. When the changeover switch 56 is in contact with an electrically conductive pattern on the switch board 50, the polarity of the motor driver is changed to drive the motor in the reverse direction. The projection 51c of the switching control member 51 projects through the slot 50d toward the changeover switch 56. When the changeover switch 56 is brought by the distal end of the projection 51c out of contact with the conductive pattern on the switch board 50, the reverse rotation of the motor is stopped.

Operation of the system thus constructed for transmitting the drive force to the mounting means will be described below.

When the switching control member 51 is not actuated, it is shifted or slid to the right from the position of FIG. 1 under the force of the neutral spring 52 so that the projection 51a is positioned intermediate between the slots 50a, 50b. The arm 35a of the switching board 35 is coupled by the switching spring 54 to the projection 51b. As the projection 51b is also in the neutral position, the tightening and loosening gears 36, 38 are spaced from the transmission gear 42, and hence the transmission system is shut off. In this condition, the motor driver is connected to a motor rotation circuit to supply an exposure completion signal from the camera to the film winder for rotating the motor. The changeover switch 56 is positioned by the projection 51c out of contact with the conductive pattern on the switch board 50, thus preventing the motor from being reversed.

When the switching control member 51 is moved in the tightening direction (to the left in FIG. 1) against the resilient force of the leg 52a of the neutral spring 52, the projection 51b pushes the leg 54a of the switching spring 54 to the left to turn the switching board 35 clockwise about the shaft 31 for thereby bringing the tightening gear 36 into mesh with the transmission gear 42. At this time, the changeover switch 56 is shifted into contact with the conductive pattern on the switch board 50, and the polarity of the power supply in the motor driver is reversed to enable the motor to start being reversed. Therefore, the rotatable shaft 26 is rotated in the direction opposite to the direction of the arrow in FIG. 2, and the cam 23 is rotated in the direction opposite to the direction of the arrow. The cam 23 and the roller 21 are out of engagement with each other at this time. The semicircular gear 3 is forced by the return spring 5 into abutment against the stop pin 4. When the motor is reversed, therefore, the motor power is transmitted through the gradual surface 23b and the roller 21 to the lower clutch plate 15 to turn the same in the direction in which the semicircular gear 3 is engaged by the stop pin 4 under the force of the return spring 5. Thus, the semicircular gear 3 is prevented from being turned. As the cam 23 rotates continuously, the roller 21 rises up the gradual surface 23b and then falls down the steeper surface 23c. Consequently, the lower clutch plate 15 on which the roller 21 is mounted is turned easily about the common shaft 16 against the resiliency of the clutch spring 17, allowing the cam 23 to rotate smoothly. Since the rotatable shaft 9 is loosely fitted through the gear 7, the upper clutch plate 14, and the lower clutch plate 15, the rotatable shaft 9 is rotated counterclockwise with the larger-diameter gear 24. The connector plate 13, with its one end frictionally fitted over the shaft 9, is turned about the shaft 9 with rotation thereof to bring the planet gear 11 into mesh with the idle gear 33 (FIG. 1). Inasmuch as the planet gear 11 is in mesh with the sun gear 10 fixed to the rotatable sahft 9, the planet gear 11 is rotated clockwise (FIG. 1). The planet gear 11 causes the idle gear 33 to rotate the main gear 30 clockwise for enabling the tightening gear 36 to rotate the transmission gears 42, 43 clockwise. The transmssion gear 43 then rotates the coupling screw 45a counterclockwise to thread the mounting screw 45b into the tripod screw hole in the camera. Therefore, the motor-driven film winder is automatically attached quickly to the camera under a fixed tightening force.

When the switching control member 51 is moved in the loosening direction (to the right in FIG. 1) against the force of the leg 52a of the neutral spring 52, the projection 51b pushes the leg 54b of the switching spring 54 to turn the switching board 35 counterclockwise about the shaft 31. The loosening gear 38 is now brought into mesh with the transmission gear 42. At this time, the changeover switch 56 is lifted by the projection 51c out of contact with the conductive pattern on the switch board 50 and then into contact with the switch board 50 again, and the motor driver is set to the motor reverse mode to enable the motor to start to be reversed. As the motor is reversed, the shaft 9 is rotated in the same manner as the foregoing screw tightening operation, and the rotative force is transmitted from the shaft 9 through the planet gear 11 and the idle gear 33 to the main gear 30. The rotative force from the smaller-diameter gear 32 fixed coaxially to the main gear 30 is transmitted via the idle gear 41 to the loosening gear 38. With the idle gear 41 meshing with the smaller-diameter gear 32 and the loosening gear 38, the loosening gear 38 is rotated in the clockwise direction that is opposite to the direction in which the tightening gear 36 is rotated. Since the loosening gear 38 is rotated by the smaller-diameter gear 32 which is smaller in diameter than the main gear 30, the speed of rotation of the loosening gear 38 is smaller than that of the tightening gear 36 and the loosening gear 38 produces a larger torque. The rotative force of the loosening gear 38 is transmitted through the transmission gears 42, 43 to the coupling gear 45a meshing with the transmission gear 43 for thereby loosening the mounting screw 45b from the tripod screw hole in the camera. The motor-driven film winder can now be detached from the camera.

The motor-driven film winder thus constructed is advantageous for the following reasons:

When the switching control member 51 is moved in the tightening direction with the film winder held against the bottom of the camera, the motor starts being reversed to rotate the mounting screw 45b into threaded engagement with the camera. Therefore, the film winder can automatically be mounted on the camera. While the motor is in rotation at this time, the cam 23 idly rotates counterclockwise merely in rolling engagement with the roller 21 at the cam surfaces 23b, 23c. The rotatale shaft 2 is not rotated, or is rotated only for a small angular interval until the semicircular gear 3 engages the stop pin 4. Thus, the film winding mechanism is not adversely affected at this time.

After the film winder has been mounted on the camera and the shutter of the camera is released to finish an exposure cycle, the motor starts being rotated in response to the end of the exposure cycle. The cam 23 is then rorated by the motor through the smaller-diameter gear 25 and the larger-diameter gear 24 to enable the steeper surface 23c to engage the roller 21, thereby turning the upper and lower clutch plates 14, 15 to turn the rotatable shaft 2 for winding the film. At this time, the sun gear 10 fixed to the rotatable shaft 9 is turned clockwise (FIG. 1) by the connector plate 13 in the direction to move the planet gear 11 out of mesh with the idle gear 33. The main gear 30 is prevented from rotating, and hence the system for transmitting the drive force to the mounting means 45 is not actuated and subject to any undesired load while the film is being wound.

For dismounting the film winder from the camera, the switching control member 51 is shifted in the loosening direction to reverse the polarity of the motor driver for reversing the motor and also to bring the loosening gear 38 into mesh with the transmission gear 42. The mounting screw 45b is now forcibly loosened out of the tripod screw hole of the camera. Since the loosening gear 38 is rotated at a lower speed and with a larger torque than the tightening screw 36, the mounting screw 45b can easily and smoothly be loosened out of the tripod screw hole even if the mounting screw 45b has been tightened excessively or the motor drive force is small due to battery consumption.

In the event that the mounting screw 45b cannot be rotated by the motor because of battery consumption, the protective cover 48 is opened to expose the auxiliary gear 46, and the knurled edge 46a thereof is manually turned to tighten or loosen the mounting screw 45b. When the protective cover 48 is turned to expose the auxiliary gear 46, the motor driver is shut off by the detector switch 49 to de-energize the motor for thereby preventing the user's finger or other objects from being accidentally caught and injured by the auxiliary gear 46.

As an alternative, when the switching control member 51 is actuated, the power transmission system from the motor to the rotatable shaft 2 may be cut off, and the motor drive force may be transmitted to the system for transmitting the drive force to the mounting means, such as the transmission gear 42, so that the mounting screw 45b can be tightened or loosened when the motor is rotated or reverse.

Although the mounting screw 45b has been described as being threaded into the tripod screw hole in the bottom of the camera, the mounting screw 45b may be designed for being threaded into another screw hole which may be defined in the bottom of the camera. Where the camera has a plurality of screw holes, the mounting means 45 may have a plurality of mounting screws for engaging in such screw holes, respectively.

When the film winder is mounted on the camera by the mounting screw 45b, the mounting screw 45b is driven by the motor through the gear train progressively into the tripod screw hole of the camera. As the mounting screw 45b is about to be fully tightened in the tripod screw hole, the frictional and tightening forces on the mounting screw 45b are abruptly increased to the point where the motor cannot be rotated any longer. The gears of the gear train involved in the power transmission are then subject to increased frictional forces imposed on the tooth surfaces. In particular, the planet gear 11 and the tightening gear 36 which are supported on the angularly movable members and can be brought forcibly into mesh with the sun gear 10 and the idle gear 33 and with the main gear 30 and the transmission gear 42, have the top lands of their teeth forcibly bite into the bottom lands of the companion gears. Consequently, quite large frictional forces are produced between these gears. As a result, the mounting screw 45b may not smoothly be loosened when the film winder is to be detached from the camera.

The above problem can be solved by employing a motor control circuit shown in FIGS. 4 through 8.

In the motor control circuit, it is assumed that the motor, denoted M, is reversed when the mounting screw 45b is rotated, and the motor M is rotated in the normal direction (referred to simply as "the motor M is rotated") when the film is wound. Thus, when the motor M is rotated, the film is wound, and when the motor M is reversed, the mounting screw 45b is rotated to attach or detach the motor-driven film winder.

Figure 4:
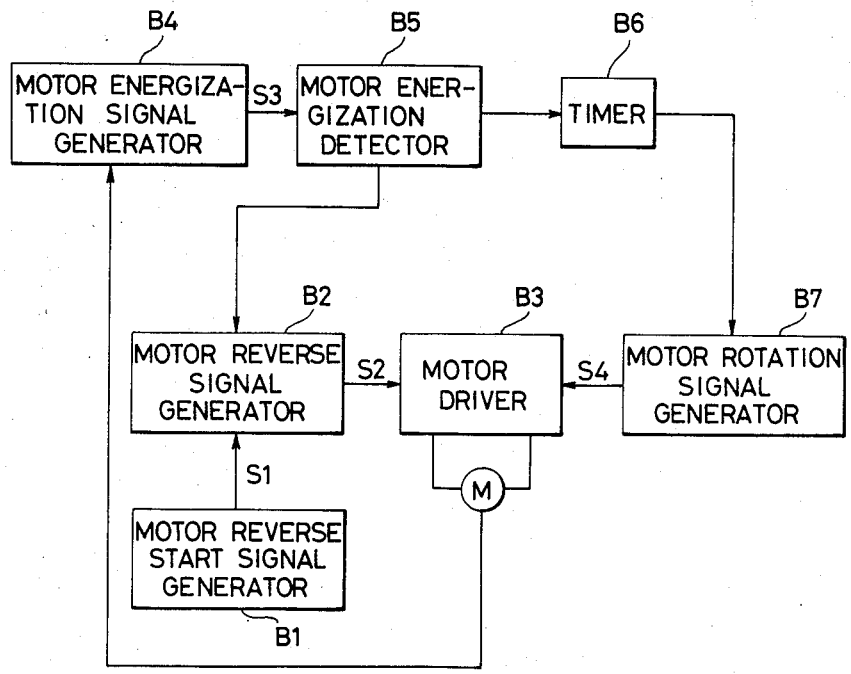
FIG. 4 is a block diagram of a motor control circuit in the motor-driven film winder.

In FIG. 4, when a motor reverse start signal S1 is generated by a motor reverse start signal generator B1, a motor reverse signal generator B2 is responsive to the motor reverse signal start signal B1 for applying a motor reverse signal S2 to a motor driver B3 to reverse the motor M. As the motor M is energized, a motor energization signal generator B4 responds to the motor energization to apply a motor energization signal S3 to a motor energization detector B5. When the motor energization detector B5 detects the motor energization through the motor energization signal S3, the motor energization detector B5 controls the motor reverse signal generator B2 to keep the motor M energized in the reverse direction. If the motor energization detector B5 detects de-energization of the motor M or a large reduction in the speed of rotation of the motor M by way of the motor energization signal S3, the motor energization detector B5 controls the motor reverse signal generator B2 to stop generating the motor reverse signal S2 and also operates a timer B6. Upon elapse of a prescribed period of time (which may be short or somewhat long), the timer B6 controls a motor rotation signal generator B7 to generate a motor rotation signal S4. The motor driver B3 is responsive to the motor rotation signal S4 to rotate the motor M in the normal direction for a short interval of time.

Figure 5:
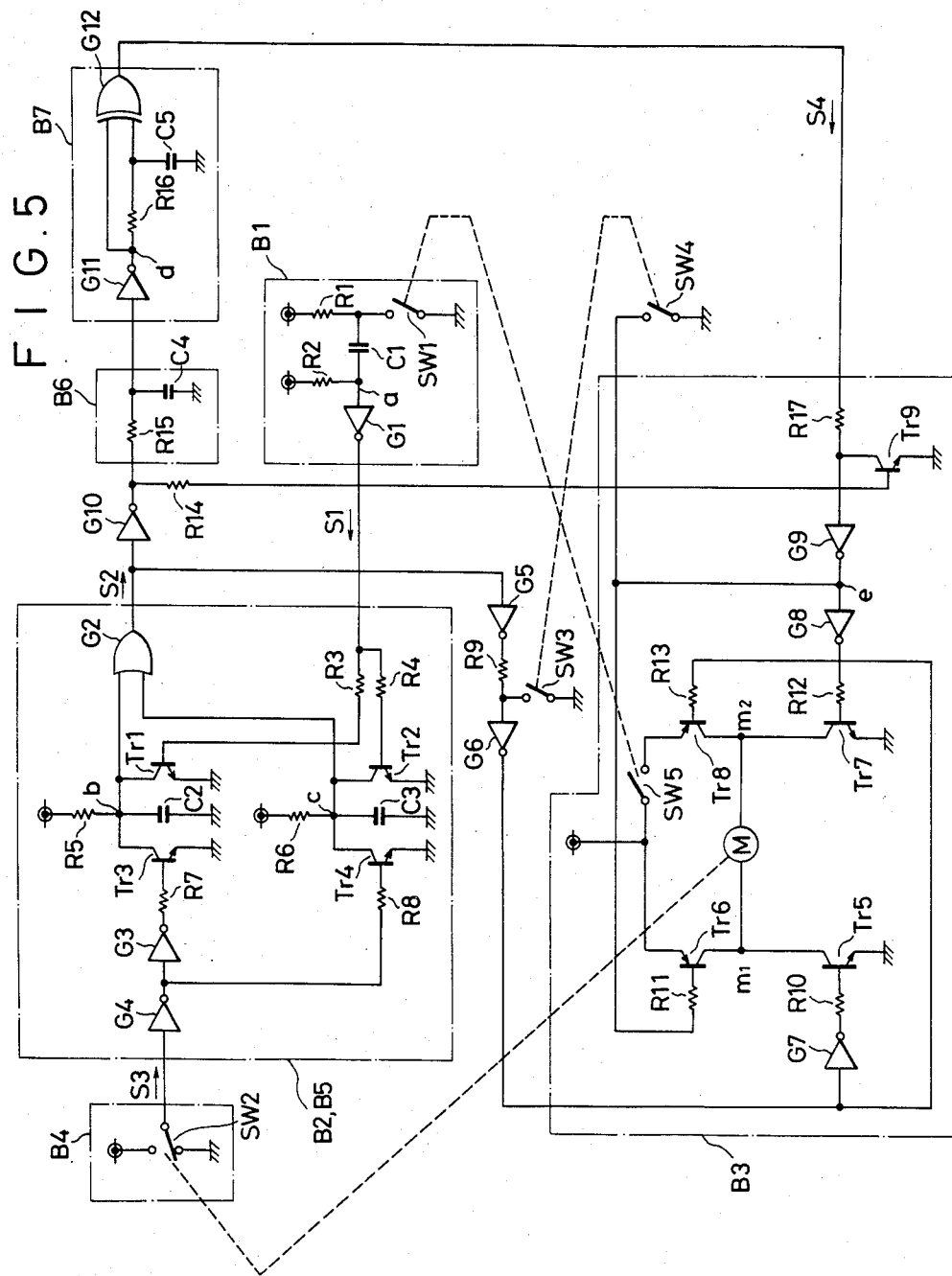
FIG. 5 is a detailed circuit diagram of the motor control circuit.

FIG. 5 is a detailed circuit diagram of the motor control circuit shown in FIG. 4. The motor reverse start signal generator B1 has a start switch SW1 for starting to detach or detach the film winder. When the switching control member 51 of FIG. 1 is shifted in the tightening or loosening direction, the start switch SW1 is closed, and when the switching control member 51 is in the neutral position, the start switch SW1 is open. The start switch SW1 may be the changeover switch 56 (FIG. 1) or a switch ganged therewith. The start switch SW1 has one terminal connected through a resistor R1 to a power supply, and the other terminal connected to ground. The junction between the resistor R1 and said one terminal of the start switch SW1 is coupled via a capacitor C1 to the input terminal of an inverter G1. The junction between the capacitor C1 and the input terminal of the inverter G1 is connected to the power supply through a resistor R2 which has the same resistance as that of the resistor R1.

The inverter G1 has an output terminal connected to the base of an NPN transistor Tr1 through a resistor R3 in the motor reverse signal generator B2. The output terminal of the inverter B1 is also connected through a resistor R4 to the base of an NPN transistor Tr2. The transistors Tr1, Tr2 have collectors connected to the two input terminals of an OR gate G2 and emitters grounded. The collector of the transistor Tr1 is also coupled the junction between one terminal of a resistor R5 and one terminal of a capacitor C2, and the collector of the transistor Tr2 is also coupled the junction between one terminal of a resistor R6 and one terminal of a capacitor C3. The other terminals of the resistors R5, R6 are joined to the power supply, and the other terminals of the capacitors C2, C3 are grounded. The junctions between the resistor R5 and the capacitor C2 and between the resistor R6 and the capacitor C3 are connected respectively to the collectors of NPN transistors Tr3, Tr4, which have emitters coupled to ground. The base of the transistor Tr3 is connected through a resistor R7 and inverters G4, G3 to the output terminal of the motor energization signal generator B4. The motor energization signal generator B4 has a motor energization signal generating switch SW2 which is turned on and off in response to energization of the motor M to generate the motor energization signal S3. The base of the transistor Tr4 is coupled to the output terminal of the motor energization signal generator B4 through the inverter G4 and a resistor R8. The motor energization detector B5 is combined with the motor reverse start signal generator B2 in FIG. 5.

Figure 7:
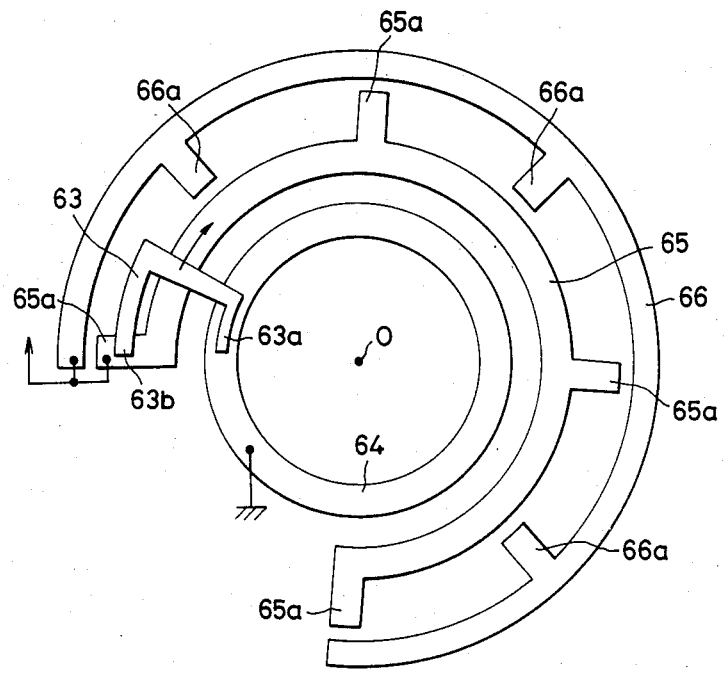
FIG. 7 is a plan view of a motor rotation signal generator for use in combination with the motor control circuit.

The motor energization signal generating switch SW2 will be described in greater detail with reference to FIG. 7. The motor energization signal generating switch SW2 is composed of electrically conductive patterns 64, 65, 66 concentric to a brush 63 which is rotatable about the center 0 in response to energization of the motor M. The brush 63 has two contacts 63a, 63b, the contact 63a being slidable on the conductive pattern 64 and the contact 63b being slidable intermittently on the conductive patterns 65, 66. The conductive patterns 65, 66 have equally spaced contacts 65a, 66a, respectively, projecting into the arcuate path of movement of the contact 63b of the brush 63. The conductive pattern 64 is ground, the conductive patterns 65, 66 are connected to the power supply through a common resistor. The junction between the common resistor and the conductive patterns 65, 66 serves to produce the motor energization signal S3. In FIG. 5, the conductive patterns 65, 66 are connected through the common resistor to the power supply, and the junction between the common resistor and the conductive patterns 65, 66 is connected to the input terminal of the inverter G4.

Figure 8:
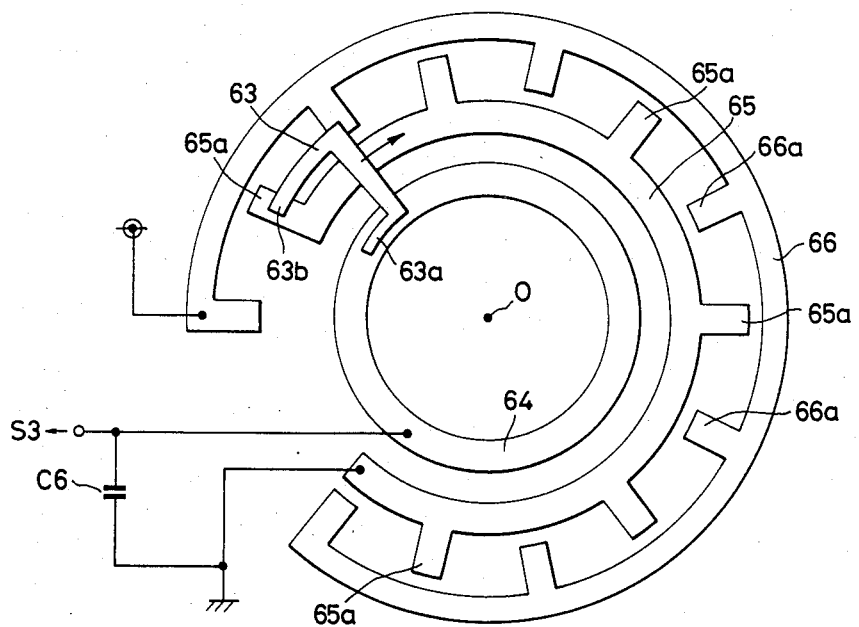
FIG. 8 is a plan view of a motor rotation signal generator according to another embodiment.

The motor energization signal generating switch SW2 may be constructed as shown in FIG. 8. In FIG. 8, a conductive pattern 66 is connected to the powre supply, and a conductive pattern 67 is connected to ground. A conductive pattern 64 and the conductive pattern 65 are connected to each other through a capacitor C6, and the junction between the conductive pattern 64 and the capacitor C6 serves to generate the motor energization signal S3. The capacitor C6 is effective in preventing chattering.

As shown in FIG. 5, the output terminal of the OR gate G2 in the motor reverse signal generator B2 is coupled through an inverter G5, a resistor R9, and an inverter G6, which are connected in series, to the input terminal of an inverter G7 in the motor driver B3. The junction between the resistor R9 and the input terminal of the inverter G6 is connected to ground via a reverse prevention switch SWe which is turned on to prevent the motor M from being reversed when the film is wound. In the motor driver B3, the output terminal of the inverter G7 is connected through a resistor R10 to the base of an NPN transistor Tr5 having an emitter grounded and a collector coupled to one terminal m1 of the motor M and the collector of a PNP transistor Tr6. The transistor Tr6 has an emitter connected to the power supply and a base connected via a resistor R11 to the input terminal of an inverter G8 and to ground through a winding control switch SW4 which is turned on in response to the end of an exposure cycle in the camera and turned off in response to the completion of film winding operation. The winding control switch SW4 and the reverse prevention switch SW3 are ganged together so that they will be opened or closed in synchronism. The output terminal of the inverter G8 is connected through a resistor R12 to the base of an NPN transistor Tr7 which has an emitter grounded and a collector joined to the other terminal m2 of the motor M and the collector of a PNP transistor Tr8. The motor M is rotated in the normal direction when a current passes therethrough from the terminal m1 to the terminal m2, and is reversed when a current flows therethrough from the terminal m2 to the terminal m1. The base of the transistor Tr8 is coupled through a resistor R13 to the input terminal of the inverter G7, and the emitter of the transistor Tr8 is connected to the positive terminal of the power supply through a reverse control switch SW5 which is turned on in response to the turning-on of the start switch SW1. The input terminal of the inverter G8 is connected to the output terminal of an inverter G9, which has an input terminal coupled to the collector of an NPN transistor Tr9. The transistor Tr9 has an emitter grounded and a base connected through a resistor R14 to the output terminal of the inverter G10. The inverter G10 has its input terminal coupled the output terminal of the OR gate G2. The output terminal of the inverter G10 is also through a resistor R15 to the input terminal of the inverter G11 in the motor rotation signal generator B7. The resistor R15 and a capacitor C4 constitute the timer B3. The junction between the resistor R15 and the input terminal of the inverter G11 is grounded through the capacitor C4. The time constant of the timer B3 is determined by the resistor R15 and the capacitor C4. In the motor rotation signal generator B7, the output terminal of the inverter G11 is connected to one input terminal of an exclusive-OR gate G12 and is connected through a resistor R16 to the other input terminal of the exclusive-OR gate G12 via a junction which is grounded through a capacitor C5. The output terminal of the exclusive-OR gate G12 is connected via a resistor R17 to the input terminal of the inverter G9 in the motor driver B3 and also to the collector of the transistor Tr9.

Figure 6:
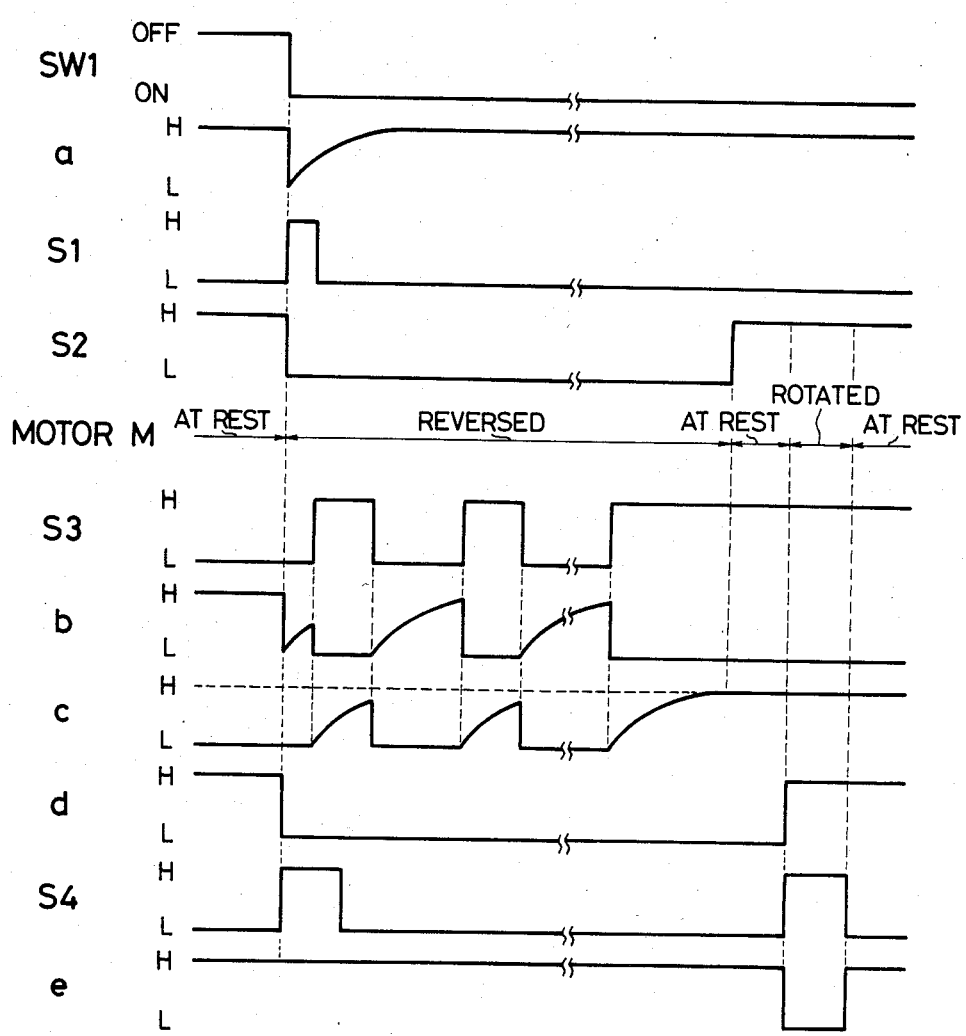
FIG. 6 is a timing chart showing operation of the motor control circuit.

Operation of the motor control circuit of the foregoing construction will be described with reference to the timing chart of FIG. 6.

When the film winder is positioned on the camera bottom and the switching control member 51 is shifted to the left (FIG. 2) in the tightening direction, the switching board 35 is turned clockwise about the shaft 31 to bring the tightening gear 36 into mesh with the transmission gear 42, so that rotation of the main gear 30 can now be transmitted to the mounting screw 35b. At the same time, the start switch SW1 and the reverse control swtich SW5 are turned on. With the start switch SW1 turned off, a high-level signal a is applied through the resistor R2 to the input terminal of the inverter G1. As the start switch SW1 is turned on, the voltage across the capacitor C1 goes low temporarily, and then the potential at a point a goes high within the time constant determined by the resistor R2 and the capacitor C1. Therefore, the reverse start signal S1 which remains high within a prescribed time period is applied from the output terminal of the inverter G1 to the bases of the transistors Tr1, Tr2 to energize them for the prescribed time period. When the transistors Tr1, Tr2 are turned on, the capacitors C2, C3 are short-circuited to make the potentials low at the two input terminals of the OR gate G2. The OR gate G2 now issues the motor reverse signal S2 which is low in level. The low-level motor reverse signal S2 is inverted by the inverter G7 into a high-level signal which energizes the transistor Tr5. At this time, the transistor Tr8 is also turned on by the low-level motor reverse signal S2. Since the reverse control switch SW5 is also turned on, the motor M is supplied with a current flowing from the terminal m2 to the terminal m1 and starts being reversed. The output of the inverter G10 is high to charge the capacitor C4 and energize the transistor Tr9, so that the potential at the input terminal of the inverter G9 goes low to turn off the transistors Tr6, Tr7. Therefore, the motor M is prevented from rotating in the normal direction.

As the motor M starts to be reversed, the main gear 30 is turned at a suitable speed reduction ratio to rotate the tightening gear 36 to thereby rotate the mounting screw 45b for beginning to mount the film winder on the camera. Since the motor energization signal generating switch SW2 is turned on and off in response to energization of the motor M (or the brush 63 in FIG. 7 slides on the conductive patterns 64 through 66), the motor energization signal SW3 as it alternatively switches between the high and low levels is applied to the input terminal of the inverter G4. When the motor energization signal S3 is low, the output of the inverter G4 goes high to turn on the transistor Tr4 to discharge the capacitor C3. Thus, the potential at one input terminal of the OR gate G2 (i.e., at a point c) goes low. Inasmuch as the output of the inverter G3 is low at this time, the transistor Tr3 is turned off to charge the capacitor C2 gradually to increase the potential at a point b. When the motor energization signal S3 goes high before the voltage across the capacitor C2 thus charged reaches a threshold level which makes the output of the OR gate G2 high, the transistor Tr3 is energized to discharge the capacitor C2. Then, the transistor Tr4 is turned off to start charging the capacitor C3. The time required for the capacitors C2, C3 to be charged up to the potential which makes the output of the OR gate G2 high is detrermined by the product of the capacitance of the capacitor C2 and the resistance of the resistor R5 or the capacitance of the capacitor C3 and the resistance of the resistor R6.

When the mounting screw 45b is threaded to a prescribed interval in the tripod screw hole of the camera, the speed of rotation of the mounting screw 45b is reduced and falls eventually to zero due to increased frictional and tightening forces. The speed of rotation of the brush 63 also falls to zero. As a consequence, the cyclic period of alternate opening and closing of the motor energization signal generating switch SW2 becomes longer, or the period in which the motor energization signal S3 remains high or low becomes longer. When either the transistor Tr3 or Tr4 is turned off, the capacitor C2 or C3 is charged. When the potential at either the point b or the point c reaches the threshold level of the OR gate G2, the output of the OR gate G2 goes high. The high-level motor reverse signal S2 then de-energizes the transistors Tr5, Tr8. At this time, the output of the inverter G10 goes low to turn off the transistor Tr9, and the input terminal of the inverter G11 is kept high for a prescribed period of time by the charged capacitor C4. Since the outputs of the inverter G11 and the exclusive-OR gate G12 remain low for the prescribed period of time, the output of the inverter G9 is high to turn off the transistors Tr6, Tr7 to de-energize the motor M. When the capacitor C4 is discharged to a level below the threshold level of the inverter G11, the output of the inverter G11 goes high to start charging the capacitor C5 in the motor rotation signal generator B7 and render the potential high at one input terminal of the exclusive-OR gate G12. Therefore, the motor rotation signal S4 which is the output from the exclusive-OR gate G12 goes high and is aplied to the inverter G9 in the motor driver B3. The output signal e from the inverter G9 goes low to turn on the transistors Tr6, Tr7. As a result, the motor M is supplied with a current flowing from the terminal m1 to the terminal m2 and starts being rotated in the normal direction. Upon elapse of a short period of time after the motor M has started to rotate, the capacitor C5 is charged to make its positive terminal high to render the output of the exclusive-OR gate G12 low. The output of the inverter G9 is rendered high to de-energize the transistors Tr6, Tr7 for stopping the motor M in its rotation in the normal direction.

After the mounting screw 45b (FIG. 1) has been tightened, the tightening gear 36 is turned slightly in the direction opposite to the direction of the arrow by the rotation of the motor M in the normal direction.

After the film winder has been mounted on the camera, the shutter is released to effect an exposure cycle. In response to the completion of travel of the rear blade of the shutter, the winding control switch SW4 and the reverse prevention switch SW3 are turned on to energize the transistors Tr6, Tr7. The motor M now starts to rotate for winding the film. During this time, the shutter is charged, and the quick-return mirror is also charged. Because the reverse prevention switch SW3 is turned on, the output of the inverter G6 is high at all times, and the transistors Tr5, Tr8 are de-energized. Therefore, the motor M is completely prevented from being reversed, and the transistors Tr6, Tr5 are prevented from being turned on simultaneously to guard against destruction.

With motor control circuit of the foregoing design being used, when the mounting screw 45b is threaded into the camera and its speed of rotation is reduced or falls to zero due to increased frictional and tightening forces, the motor energization detector B5 detects the film winder being completely mounted on the camera and de-energizes the motor M.

At this time, since the gears shown in FIG. 1 are forcibly urged to turn in the directions of the arrows, those gears positioned between the motor M and the mounting gear 45b are subject to large frictional forces. Particularly, the tightening gear 36 is forcibly wedged between the main gear 30 and the transmission gear 62. In this condition, the switching control member 51 would not rerurn to the original position even under the force of the neutral spring 52, and the switching board 35 would not be turned to fail to rotate the mounting screw 45b in the loosening direction. However, the motor control circuit of the invention enables the motor M to be slightly reversed after it has been stopped, for releasing the meshing gears of pressing forces. Especially, the tightening gear 36 is turned away from the transmission gear 62 in the direction opposite to the direction of the arrow, so that the switching control member 51 returns reliably to its original position under the resiliency of the neutral spring 52. The mounting screw 45b can now be loosened at any time.

When loosening the mounting screw 45b, the loosening gear 38 is turned in the direction to be wedged between the idle gear 41 and the transmission gear 42. However, inasmuch as the torque produced in loosening the mounting screw 45b is small and the gear train is not subject to impact forces, the loosening gear 38 is prevented from biting into the transmission gear 42.

The motor energization detector B5, the motor reverse signal generator B2, anmd the motor driver B3 are arranged such that when the speed of rotation of the motor M is lowered below a predetermined level or the motor M is stopped, the motor M is de-energized or braked. Accordingly, the film winder can be mounted on the camera under constant conditions, and the mounting screw 45b is prevented from being excessively threaded into the camera.

When the motor M is stopped even if the motor energization signal generating switch SW2 remains on or off, either the transistor Tr3 or Tr4 is turned off to charge the capacitor C2 or C3 up to the threshold level. Therefore, the stoppage of the motor M is detected without fail. The motor M is thereafter reversed by the timer B upon elapse of a short period of time. The transistors Tr8, Tr5 for reversing the motor M and the transistors Tr6, Tr7 for rotating the motor M are prevented from being turned on simultaneously and also from being destructed.

After the mounting screw 45b has been tightened, the motor M is rotated to separate the idle gear 11 from the idle gear 33. Thus, the mechanism for automatically mounting the film winder on the camera does not affect the film winding operation effected by rotation of the motor M.

By limiting the ranges of movement of the switching board 35 and the connetor plate 13, any biting engagement between the tightening gear 36 and the transmission gear 42 and between the planet gear 11 and the idle gear 33 can be held to a minimum. However, if any meshing gears are stopped under strong pressing forces, they are subject to large frictional forces and should be released by reversing the motor M as described above.

Instead of employing the connector plate 13 and the planet gear 11, another mechanism may be used for transmitting the drive force from the motor M to the mechanism for automatically mounting the film winder on the camera so that the mounting screw 45b may be rotated by the motor which rotates in the same direction as the direction in which the film is wound. With this modification, the automatic mounting mechanism may be operatively coupled to and disconnected from the motor M in response to sliding movement of the switching control member 51.

The motor control circuit shown in FIG. 5 may be implemented by a microcomputer programmed to perform the same functions as those described above.

An excessive torque takeup mechanism may be disposed in the gear train from the motor M to the coupling gear 45a for producing slippage when a torque greater than a certain level is generated. Such an excessive torque takeup mechanism can prevent the motor from suffering from an undue load and allows the mounting screw 45b to be tightened under stabler tightening forces.

As described above, the motor-driven film winder can automatically be mounted on and dismouned from the camera by utilizing the drive force produced by the motor. Therefore, the motor-driven film winder can easily and efficiently be attached and detached.

It is also convenient for the mounting screw to be manually rotatable so that the film winder can be manually attached to or detached from the camera through a manual rotation member even if the power supply, typically batteries, for energizing the motor fails due to excessive consumption. However, while the film winder is being attached or detached automatically by the motor, the user's finger may be caught and injured by the manual rotation member which is also rotated by the motor.

Figure 9A:
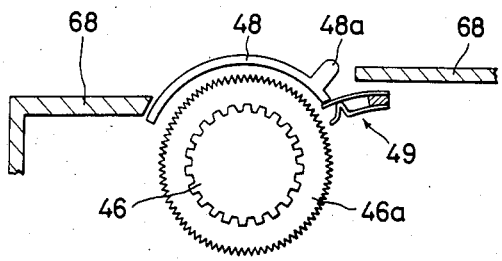
FIGS. 9(a) and (b) are plan views of a protective cover, the views showing different operation modes.

FIGS. 9(a) and (b) illustrate a protective cover designed for preventing the above danger of injury.

In FIG. 9(a), the protective cover 48 is in a closed position in which the auxiliary gear 46 with the knurled surface or rotatable control disc 46a operatively coupled to the mounting screw is completely covered with the protective cover 48 and a casing 68 which serves as an outer housing of the film winder. Therefore, the rotatable control disc 46a cannot be touched by fingers. The detector switch 49 is turned on by the distal end of the protective cover 48, and hence the motor for winding the film can be energized. Therefore, when the switching control member 51 (FIG. 1) is shifted in the tightening direction or the loosening direction at this time, the chageover switch 56 is brought into contact with the conductive pattern on the switch board 50 to enable the motor to start being reversed. The mounting screw 45b is now rotated to attach or detach the film winder.

Figure 9B:
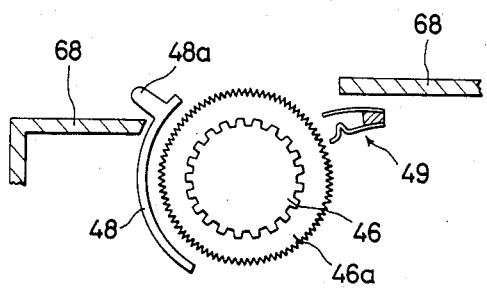

FIG. 9(b) shows the protective cover 48 which is turned around the rotatable control disc 46a by a finger engaging the knob 48a to expose an opening defined in the casing 68. At this time, the rotatable control disc 46acan be turned by a fingertip inserted externally through the exposed opening. The detector switch 49 is turned off and the motor cannot be energized. Thus, the rotatable control disc 46a is prevented from being rotated by the motor. Under this condition, the motor is not energized even if the switching control member 51 is shifted in the tightening direction or the loosening direction. By turning the rotatable control disc 46a with the fingertip, the mounting screw 45b can be rotated to manually attach or detach the film winder.

With the protective cover means thus constructed being used, when the film winder is to be automatically mounted on or dismounted from the camera by the motor, the rotatable control disc 46a is covered with the casing 68 and the protective cover 48 to guard against being touched by fingers. No finger is allowed to touch the rotatable control disc 46a which is driven to rotate by the motor, and hence no fingertip is prevented from being caught and injured between the casing 68 and the rotatable control disc 46a. If the protective cover 48 remains open due to an oversight, then the detector switch 49 detects that the protective cover 48 is open, and inhibits the motor from rotating the rotatable control disc 46a. Accordingly, there is no danger even if the protective cover 48 is kept open due to an oversight or operated in error.

In addition, the protective cover 48 as it covers the rotatable control disc 46a prevents foreign matter from touching the rotatable control disc 46a or entering the casing 68 while the automatic mounting mechanism is being used. The automatic mounting mechanism is thus protected against operation failures which would otherwise arise from the entry of foreign matter. The protective cover 48 also improves the appearance of the film winder.

Where the space, layout or weight of the parts in the film winder permits, the rotatable control disc 46a may be dispensed with and mounting means 45 may perform the function of the rotatable control disc 46a, with the means 45 partly projecting out of the casing 68 for being manually operated upon.

The detector switch 49 may be in the form of a photocoupler switch disposed in the range of movement of the protective cover 48 so that the photocoupler switch can be turned on or off as the protective cover 48 is angularly moved to transmit or block light. The detector switch 49 may also comprise other switches. It is also possible to provide a means responsive to operation of the detector switch 49 for producing an optical or audible indication or warning to let the user know that the protective cover 48 is open or closed.

The protective cover 48 may be shaped otherwise insofar as it can cover the attachement and detachment means or the manually rotatable control means.

Furthermore, a clutch which may be a mechanical clutch or an electromagnetic clutch may be disposed in the drive force transmission system from the motor to the means 45 or the coupling gear 45a. The clutch may be mechanically or electrically coupled to the protective cover 48 such that when the protective cover 48 is opened, the clutch can be disconnected, and when the protective cover 48 is closed, the clutch can be connected.

When mounting the film winder on the camera, it is necessary to position the mount surface of the film winder accurately in alignment with the mount surface of the camera. If the mount surface of the film winder were not positioned accurately in alignment with the mount surface of the camera, then the following various problems would arise: First, the drive coupler of the film winder would not be properly connected to the driven coupler of the camera, so that the film would not be wound smoothly. Secondly, electric connection between the camera and the film winder through a plurality of contacts would not be made as desired. As a third problem, any guide member such as a positioning pin disposed on the film winder for positioning the camera with respect to the film winder would tend to be broken or impose a bending force on the camera or the film winder when the guide pin would not be positioned correctly with respect to the mount surface (generally the bottom) of the camera, e.g., when the camera would be placed on the guide member and the film winder would be automatically mounted on the camera by the motor.

FIGS. 10, 11, 12(a) and 12(b) show a mount unit capable of positioning the mount surface of the film winder properly with respect to the mount surface of the camera.

Figure 10:
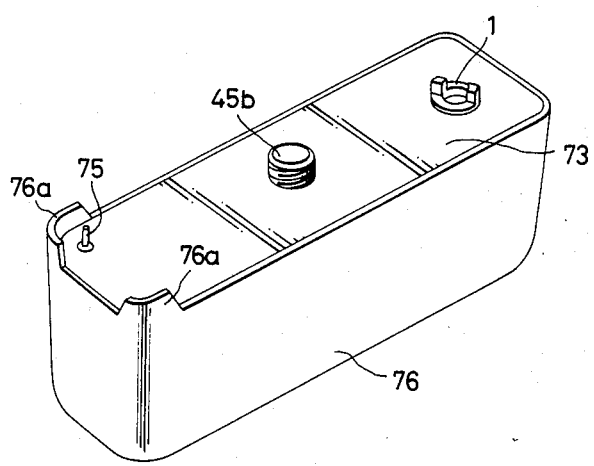
FIG. 10 is a perspective view of a mount unit.

In FIG. 10, the film winder has a mounting plate 73 to be mounted on the mount surface of the bottom of the camera. From the mounting plate 73, there project upwardly the drive coupler 1 for engaging the driven coupler of the camera to drive the film winding mechanism in the camera, and the mounting screw 45b for being threaded into the tripod screw hole of the camera to attach the film winder to the camera, the mounting screw 45b being normally urged under spring forces to project upwardly so that it can be retracted into the film winder when subject to external forces. An engagement detector pin 75 retractably projects upwardly from the mount plate 73 near one of its corners. When the pin 75 projects, it serves to apply a trouble signal to the motor driver for preventing the motor from being energized. When the pin 75 is pushed by the camera bottom into the film winder, it operates to issue a normal signal to the motor driver to enable the same to be energized. Although not shown, the mount plate 73 has on its upper mount surface a plurality of electric contacts for electric connection between the camera and the film winder to transmit signals therebetween. The film winder has a side plate 76 including a pair of upstanding guides 76a, 76b projecting upwardly beyond the mount plate 73 near two adjacent corners thereof, each of the upstanding guides 76a, 76b being arcuate in cross section.

Figure 11:
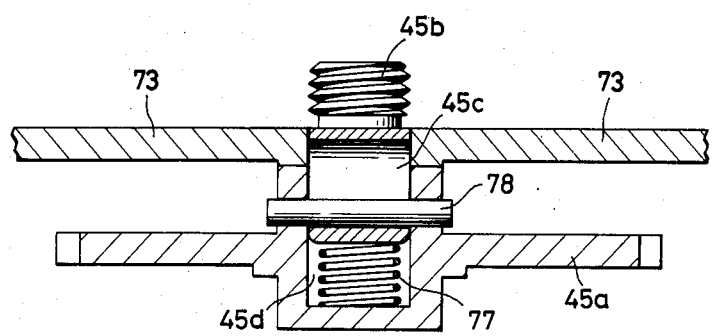
FIG. 11 is an enlarged cross-sectional view of a mounting screw in mount unit of FIG. 10.

FIG. 11 shows the mounting screw 45b in greater detail. The mounting screw 45b has an externally threaded upper half portion threaded engageable in the screw hole in the bottom of the camera. The mounting screw 45b also has a slot 45c defined in a lower half portion thereof and extending longitudinally in the vertical direction. The mounting screw 45b is fixedly coupled to the coupling gear 45a supporting the mounting screw 45b for transmitting the rotational force from the motor to the mounting screw 45b to rotate the same. The coupling gear 45a has a central screw socket 45d in the form of a bottomed hollow cylinder. The lower half portion of the mounting screw 45b is fitted in the screw socket 45d and is normally urged by a spring 77 to project upwardly. A pin 78 extends across the screw socket 45d through the slot 45c. The mounting screw 45b is allowed by the pin 78 to move axially for a certain interval with respect to the coupling gear 45a. The rotative force from the coupling gear 45a is transmitted through the pin 78 to the mounting screw 45b. Thus, when the motor is energized, the mounting screw 45b is rotated by the coupling gear 45a through the pin 78. When the camera is held against the mount surface of the mount plate 73, the mounting screw 45b is retracted into the screw socket 45d against the force of the spring 77 while being guided by the pin 78 extending through the slot 45c.

Figure 12A:
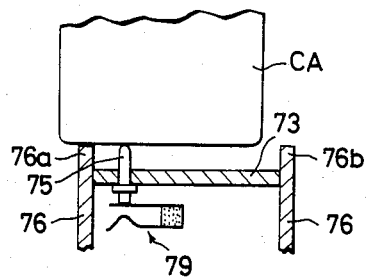
FIGS. 12(a) and 12(b) are sectional side elevational views of the mount unit, the views illustrating different operation modes.

The film winder having the mount unit as shown in FIGS. 10 and 11 can be mounted on the camera in the following manner:

In FIG. 12(a), the film winder is not properly mounted on the camera, denoted CA. At this time, the bottom of the camera CA is placed on the upstanding guide 76a of the side plate 76, and the engagement detector pin 75 is not depressed by the camera bottom, but projects upwardly from the mount plate 73. An engagement detector switch 79 in the form of a normally-open switch is disposed below the mount plate 73 and can be turned on and off by the pin 75. When the pin 75 is not depressed by the bottom of the camera CA, it remains elevated under the resilient force of the engagement detector switch 79. The engagement detector switch 79 is turned off at this time to break the power supply circuit for thereby de-energizing the motor control circuit. Therefore, even when the switching control member 51 (FIG. 1) mounted on the side plate 76 is shifted under this condition, the motor is not energized and thus the mounting screw 45b is not rotated. As a result, when the camera CA and the film winder are positioned as shown in FIG. 12(a), the film winder is not automatically mounted on the camera CA, letting the user know that the camera CA and the film winder are not properly positioned with respect to each other.

Figure 12B:
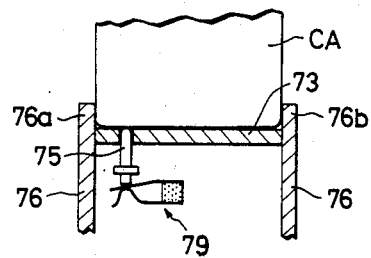

FIG. 12(b) shows the film winder properly held against the camera CA. The bottom of the camera CA is guided by the two upstanding guides 76a, 76b so as to engage the mount surface of the mount plate 73. The engagement detector pin 75 is therefore depressed by the bottom of the camera CA into the film winder to turn on the engagement detector switch 79, which makes the power supply circuit to energize the motor control circuit. When the switching control member 51 is moved in the tightening direction under this condition, the motor is reversed to rotate the tightening screw 45b into threaded engagement in the tripod screw hole of the camera CA. Since the mounting screw 45b is retractable into the film winder as shown in FIG. 11, the engagement detector pin 75 and the mounting screw 45b are displaced into the film winder when the mount surface of the film winder engages the mount surface of the camera CA before the film winder is automatically mounted on the film winder. The mount surface of the film winder is now held against the bottom of the camera CA with the tripod screw hole and the mounting screw 45b axially aligned with each other. Consequently, when the mounting screw 45b is rotated by the motor, it can smoothly be threaded into the tripod screw hole without damage to the screw threads which would otherwise result from misalignment between the mounting screw 45b and the tripod screw hole of the camera CA. The mounting screw 45b is also prevented from being tightened into the tripod screw hole while the camera and the film winder are relatively positioned as shown in FIG. 12(a). The camera and the film winder can therefore be prevented from being damaged under undue bending forces applied.

Therefore, by holding the film winder against the camera CA with the upstanding guides 76a, 76b of the side plate 76 engaging corners of the bottom of the camera CA, the film winder can properly be mounted on the camera by energizing the motor, and the drive coupler 74 and the driven coupler of the camera CA can correctly be coupled mechanically, while at the same time the film winder and the camera CA can accurately be coupled electrically.

The bottom of the camera CA can accurately be positioned with respect ot the mount plate 73 of the film winder simply by holding the upstanding guides 76a, 76b against the corners of the bottom of the camera CA and bringing the bottom of the camera CA against the upper surface of the mount plate 73. It is therefore not necessary for the user to be skillful in locating the tripod screw hole and the mounting screw 45b. The film winder of the invention can therefore be mounted easily and accurately on the camera even by a novice.

The film winder can also manually mounted on the camera as described above. When the film winder is to be manually attached to the camera, the film winder can be attached irrespectively of how the engagement detector pin 75 is positioned. However, where the user attempts to manually mount the film winder as it is improperly positioned with respect to the camera, the engagement detector pin 75 projects from the mount plate 73 and hence the power supply circuit is broken. As the motor is not energized at this time, the film cannot be wound, letting the user know that the film winder has not been properly mounted.

Only one upstanding guide may be located closely to the engagement detector pin 75. However, the camera and the film winder can be positioned relatively to each other more quickly by a plurality of upstanding guides as illustrated.

A positioning pin or positioning pins may be mounted on the mount surface of the mount plate 73 in place of or in addition to the upstanding guides 76a, 76b. The film winder can be positioned with respect to the camera by fitting the positioning pin or pins in a corresponding recess or recesses defined in the bottom of the camera CA.

The engagement detector switch 79 may comprise a normally-closed switch which may make the power supply circuit to energize the motor when the engagement detector pin 75 projects on the mount plate 73 and which may break the power supply circuit to de-energize the motor when the engagement detctor pin 75 is retracted into the film winder. More specifically, when the film winder is properly mounted on the camera CA, the engagement detector pin 75 is fitted in a corresponding recess defined in the bottom of the camera CA to energize the motor. When the film winder is not properly mounted on the camera CA, the engagement detector pin 75 is not fitted in the recess, but is retracted into the film winder to break the power supply circuit, thus preventing the motor from being energized. With this alternative, the film winder can accurately be positioned with respect to the camera without relying upon the upstanding guides 76a, 76b.

Although a certain preferred embodiment has been shown and described, it should be understood that many changes and modifications may be made therein without departing from the scope of the appended claims.

We claim:

1. A motor-driven film winder for use with a camera having a film winding mechanism and a screw hole, comprising:
   a motor;
   drive coupler means for engagement with the film winding mechanism of the camera;
   first transmission means for transmitting rotative power from said motor to said drive coupler means;
   mounting means for threaded engagement in the screw hole of the camera;
   second transmission means for transmitting rotative power from said motor to said mounting means; and
   selector means for selectively operating one of said first and second transmission means at a time.

2. A motor-driven film winder according to claim 1, wherein said motor comprises a reversible motor, said first transmission means comprising a first speed reducer gear train operatively coupled to said motor and including clutch means for connecting said first speed reducer gear train to said drive coupler means when said motor rotates in one direction and for disconnecting said first speed reducer gear train from said drive coupler means when said motor rotates in the opposite direction.

3. A motor-driven film winder according to claim 2, wherein said second transmission means comprises a second speed reducer gear train operatively coupled to said mounting means and including gear means for disconnecting said second speed reducer gear train from said motor when said motor rotates in said one direction and for connecting said second speed reducer gear train to said motor when said motor rotates in said opposite direction.

4. A motor-driven film winder for use with a camera having a film winding mechanism and a screw hole, comprising:
   a motor;
   drive coupler means for driving engagement with the film winding mechanism;
   transmission means for transmitting rotative power from said motor to said drive coupler means;
   a main gear rotatable by said motor about its own axis;
   a first selector gear angularly movable about said axis of said main gear and rotatable with said main gear in a direction opposite to the direction of rotation of said main gear;
   a second selector gear angularly movable about said axis of said main gear and rotatable with said main gear in a direction opposite to the direction of rotation of said second selector gear;
   mounting means for threaded engagement in the screw hole of the camera; and
   switching control means for selectively coupling one of said first and second selector gears at a time operatively to said mounting means.

5. A motor-driven film winder according to claim 4, including a switching board angularly movable about the axis of said main gear, an auxiliary gear fixed coaxially to said main gear, and an idle gear supported on said switching board and held in mesh with said auxiliary gear, said first selector gear being supported on said switching board in mesh with said main gear, said second selector gear being supported on said switching board in mesh with said idle gear.

6. A motor-driven film winder according to claim 5, wherein said mounting means comprises a coupling gear and a mounting screw fixed coaxially to said coupling gear and threadedly engageable in said screw hole of the camera, further including a first transmission gear held in mesh with said coupling gear and a second transmission gear fixed coaxially to said first transmission gear, said switching board being angularly movable for selectively bringing said first or second selector gear into mesh with said second transmission gear.

7. A motor-driven film winder for use with a camera having a film winding mechanism and a screw hole, comprising:
   a reversible motor;

drive coupler means for driving engagement with the film winding mechanism;

transmission means for transmitting rotative power from said motor to said drive coupler means;

a mounting screw for threaded engagement in the screw hole of the camera;

switching means for enabling said motor to rotate said mounting screw selectively in one or opposite direction to tighen or loosen said mounting screw into or from said screw hole of the camera;

detector means for producing a signal indicating the completion of tightening of said mounting screw in said screw hole; and reverse drive means for reversing said motor for a short period of time to rotate said mounting screw in said opposite direction to loosen the mounting screw.

8. A motor-driven film winder for use with a camera having a film winding mechanism and screw hole, comprising:

a motor;

drive coupler means for driving engagement with the film winding mechanism;

first transmission means for transmitting rotative power from said motor to said drive coupler means;

a mounting screw for threaded engagement in the screw hole of the camera;

second transmission means for transmitting rotative power from said motor to said mounting screw to rotate the same;

rotatable control means manually rotatable for rotating said mounting screw;

a protective cover for covering and exposing a manually accessible portion of said rotatable control means;

drive control means for preventing said motor from rotating said mounting screw when said protective cover is open and for enabling said motor to rotate said mounting screw when said protective cover is closed.

9. A motor-driven film winder according to claim 8, wherein said rotatable control means comprises a circular knurled edge, said protective cover comprising an arcuate member movably extending in covering relation to a portion of said circular knurled edge.

10. A motor-driven film winder for use with a camera having a film winding mechanism and a screw hole, comprising:

a motor;

drive coupler means for driving engagement with the film winding mechanism;

first transmission means for transmitting rotative power from said motor to said drive coupler means;

a mount surface;

a mounting screw disposed on said mount surface for threaded engagement in the screw hole of the camera;

second transmission means for transmitting rotative power from said motor to said mounting screw to rotate the same;

means for issuing a normal signal when the camera is placed on said mount surface in alignment therewith and for issuing a trouble signal when the camera is placed out of alignment with said mount surface; and drive control means for enabling said motor to rotate said mounting screw in response to said normal signal and for preventing said motor from rotating said mounting screw in response to said trouble signal.

* * * * *